United States Patent [19]
Collins

[11] 4,118,783
[45] Oct. 3, 1978

[54] DIGITAL GRADE AVERAGER

[76] Inventor: William L. Collins, 422 Forest St., Marion, Ohio 43302

[21] Appl. No.: 766,371

[22] Filed: Feb. 7, 1977

[51] Int. Cl.$^2$ .................. G06F 15/02; G06F 15/20
[52] U.S. Cl. .................. 364/734; 364/709
[58] Field of Search .................. 235/156, 164, 193; 364/734, 709, 200, 900; 35/1, 6

[56] References Cited

U.S. PATENT DOCUMENTS

| | | | |
|---|---|---|---|
| 3,470,368 | 9/1969 | Brittan | 235/193 |
| 3,783,257 | 1/1974 | Friedman et al. | 235/156 |
| 4,048,484 | 9/1977 | Brittan | 364/734 |

*Primary Examiner*—David H. Malzahn
*Attorney, Agent, or Firm*—Buell, Blenko & Ziesenheim

[57] ABSTRACT

The apparatus is a calculator for use by teachers which adds letter grades, accompanied, if desired, by plus or minus signs, averages those grades in terms of their numerical equivalents and displays the average grade and also the number of grades averaged. Letter grades are entered from a key board as binary coded digits. Plus and minus signs are assigned a decimal fraction value and are also entered in binary code. The grades so entered are added in a binary coded decimal counter, the outputs of which are returned to the calculator as a divisor and are also passed to binary decoders which drive conventional digital entry display elements. The average grade is displayed by conventional calculator display elements.

9 Claims, 5 Drawing Figures

DIGITAL GRADE AVERAGER

This invention relates to a calculator adapted to tabulate and average grades assigned by a teacher to the work of pupils or the like. It is more particularly concerned with such a calculator that tabulates and averages letter grades which may be accompanied by plus and minus signs.

It is common practice in teaching classes to grade the work of students in terms of letters such as A, B, C, and so on which may be further narrowed by the use of plus and minus signs such as A—, B+ and so on. For the purpose of averaging grades over a term or portion thereof a five letter system is frequently used, A, B, C, D, for grades and F for failure, and the numerical values assigned to those letters are commonly 4, 3, 2, 1 and 0 respectively. When plus and minus signs are used they indicate a grade intermediate the letter of the grade and its nearest adjacent letter above or below. It is tedious to average such grades because the letters and the signs must be converted into numerals and it may be desired to convert the numerical average back to a letter or sign.

It is the principal object of my invention to be described hereinafter to provide a special purpose electronic calculator for this use. It is another object to provide such a calculator with a display of the number of grades added for averaging. Other objects of my invention will appear in the course of the following description thereof.

My calculator is constructed primarily of integrated circuit elements. It may utilize a conventional calculator integrated circuit element. However, as only five grade entries, together with plus and minus sign entries are made, a simplified calculator integrated circuit may be employed. To provide an average read-out to two decimal places only three display elements are required, which are conventional. Two display elements only are required for entry tabulation, as the number of grades included in the average is not likely to exceed double figures. The letter grades are entered from a keyboard as binary coded digits. Plus and minus signs are assigned a numerical value of 0.3 and are also entered in binary code. The grades are added in a binary coded decimal counter, the outputs of which are passed to a pair of binary decoders which drive conventional seven-segment digital entry display elements. The average grade is displayed by conventional calculator seven-segment display elements.

An embodiment of my invention presently preferred by me is illustrated in the attached figures, to which reference is now made.

BLOCK SCHEMATIC

Figure 1:
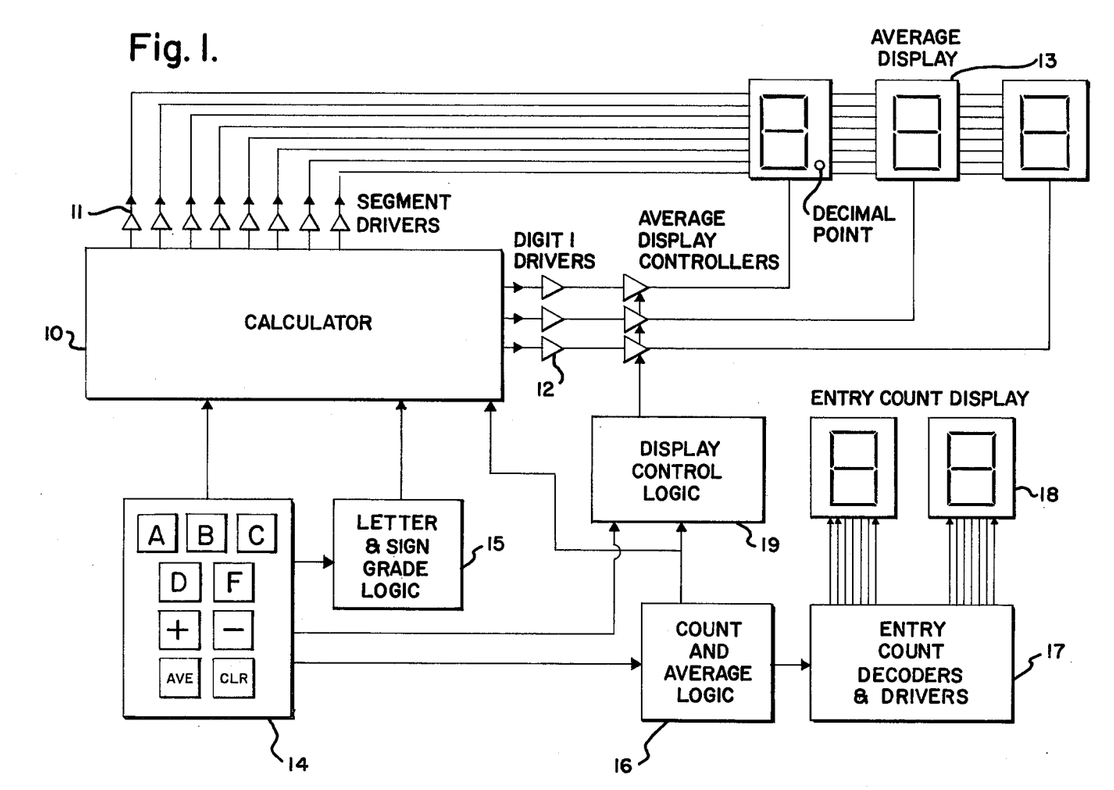
FIG. 1 is a block schematic of my apparatus.

In FIG. 1 a conventional integrated circuit element 10 is connected through conventional segment drivers 11 and digit drivers 12 to a three-element average display array 13 which displays the average of the grades entered into calculator 10. Conventional seven-segment elements are employed in array 13, the first having a decimal point indicated to the right of the display. A keyboard 14 is provided with five keys for letter grades, a plus key and minus key, a key for actuating the averaging logic and a key for clearing the apparatus. The keyboard is connected directly to the calculator for entering the letter grades in binary code and also to the calculator through logic 15 to be described for adding letter grades and for entering or subtracting plus and minus sign grades.

The number of letter grades entered is counted in binary code by count and averaging logic element 16. That number is decoded in decoder 17 and displayed on two-element display 18. The averaging logic in element 16 is actuated by the average key on keyboard 15 and transmits the count to display control logic 19 and to the calculator 10, which divides the algebraic sum of letters and signs by the number displayed on display count 18.

In the circuits of FIGS. 2, 3, 4, and 5 to be described the conventional symbol for ground is used to indicate a common return and negative voltage source terminal, and a square to indicate a common positive potential terminal.

KEYBOARD

Figure 2:
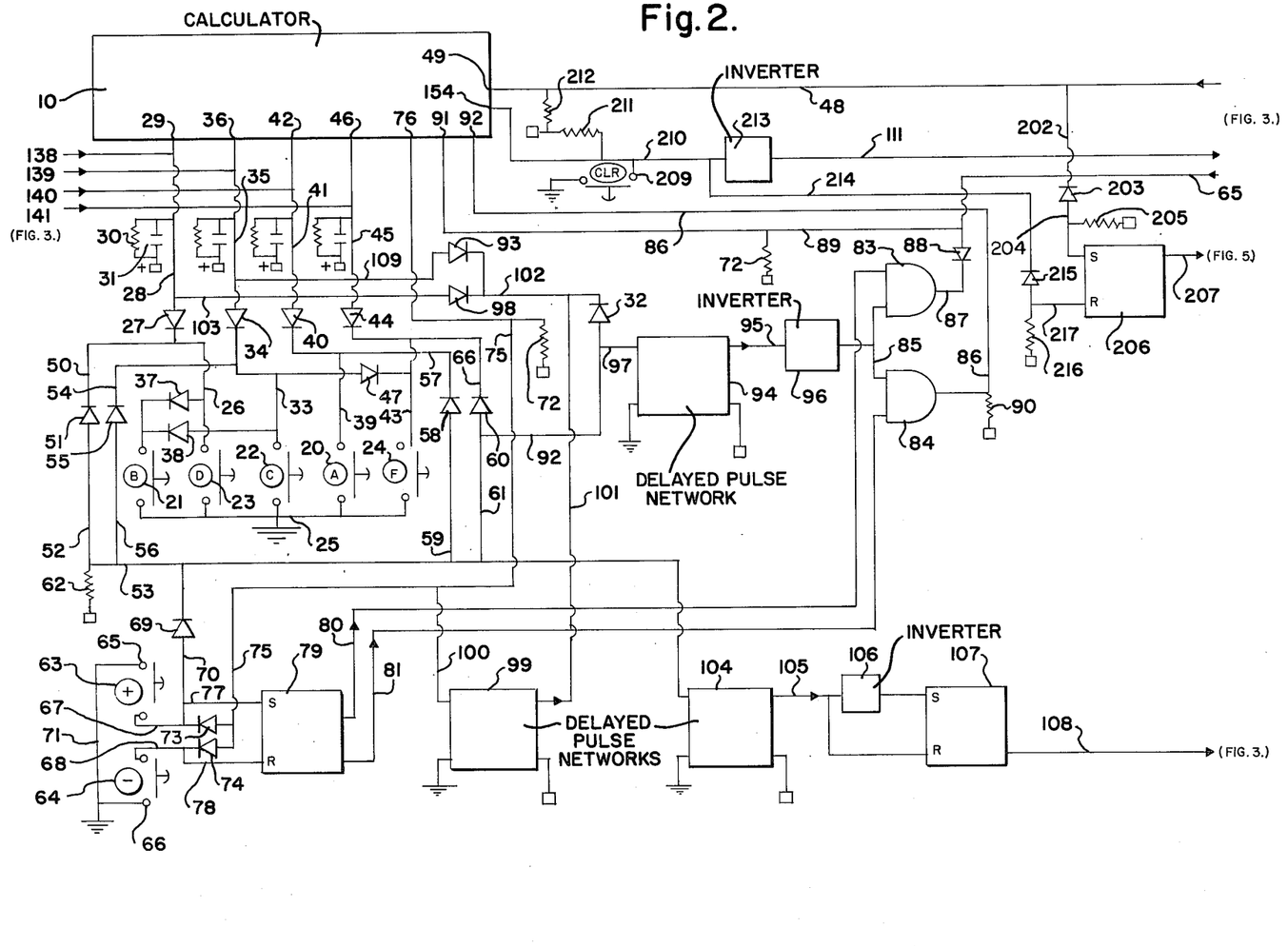
FIG. 2 is a schematic of the keyboard and the logic associated therewith for entering letters and sign grades in the calculator and for adding letter grades and adding and subtracting signs associated therewith.

In FIG. 2 letter key switches 20, 21, 22, 23 and 24 for the letters A, B, C, D and F respectively each has one contact connected to a common point 25. The other contact of key switch 23 is connected through conductor 26, diode 27 and conductor 28 to input terminal 29 of calculator 10. As key switch 23 represents the grade letter D which has a numerical value of 1, terminal 29 is the calculator input terminal for digit 1. Conductor 28 is also connected to a paralleled resistor 30 and capacitor 31, the other terminals of which are connected to the positive voltage source, so that the closing of key switch 23 impresses a negative pulse on terminal 29.

Key switch 22, representing letter C, with a grade value of 2, is connected through conductor 33, diode 34 and conductor 35 with input terminal 36 of calculator 10. This terminal is the input terminal for digit 2. Key switch 21, representing letter B, is connected through diode 37 with conductor 26 and through diode 38 with conductor 33, that is, the calculator inputs for digits 1 and 2. Key switch 20, representing letter A, is connected through conductor 39, diode 40 and conductor 41 with the input terminal 42 for digit 4. Key switch 24, representing F, is connected through conductor 43, diode 44 and conductor 45 to input terminal 46 of calculator 10, the input for digit 8. Conductor 43 is also connected through diode 47 with conductor 33, which leads to input terminal 36 for digit 2, so that key switch 24 enters zero when it is depressed.

Conductors 35, 41 and 45 are connected to positive voltage through parallel resistor-capacitor networks identical with resistor 30 capacitor 31 network previously described.

Conductor 26 is connected through conductor 50, isolation diode 51 and conductor 52 to conductor 53. Conductor 33 is connected through conductor 54, diode 55 and conductor 56 to conductor 53. Conductor 39 is connected through conductor 57, diode 58 and conductor 59 to conductor 53. Conductor 43 is connected through conductor 66, diode 60 and conductor 61 to conductor 53. Conductor 53 is connected to positive voltage through resistor 62.

Conductor 53 is also connected through diode 69 and conductor 70 to the live terminal of key switch 63, representing the plus grade sign. The other terminal of that switch is connected through conductor 71 to ground and to one terminal of key switch 64 representing the minus grade sign.

The live terminal of key switch 63 is connected through conductor 67 and diode 73 to conductor 75, as is the live terminal of key switch 64 through conductor 68 and diode 74. Conductor 75 is connected to decimal point function terminal 76 of calculator 10 and to positive voltage through resistor 72.

LETTER AND SIGN GRADE LOGIC

The live terminals of key switches 63 and 64 are also connected by conductors 77 and 78 respectively to the set and reset inputs of a set-reset flip-flop 79. The set output of flip-flop 79 is connected by conductor 80 to one input of a two-input NAND gate 83 and the rest output of flip-flop 79 is connected by conductor 81 to one input of a two-input NAND gate 84. The other two input terminals of those gates are connected together by conductor 85. The output terminal of gate 83 is connected through conductor 87, diode 88 and conductor 89 to terminal 91 of calculator 10, the plus or add function terminal, and to positive voltage through resistor 72. The output terminal of gate 84 is connected through conductor 86 to terminal 92 of calculator 10, the minus or subtract function terminal. Conductor 86 is also connected to positive voltage through resistor 90.

Conductor 53 is connected through conductors 61 and 92 to the input of delayed pulse network 94. The output of network 94 is connected through conductor 95 and inverter 96 to conductor 85.

Figure 4:
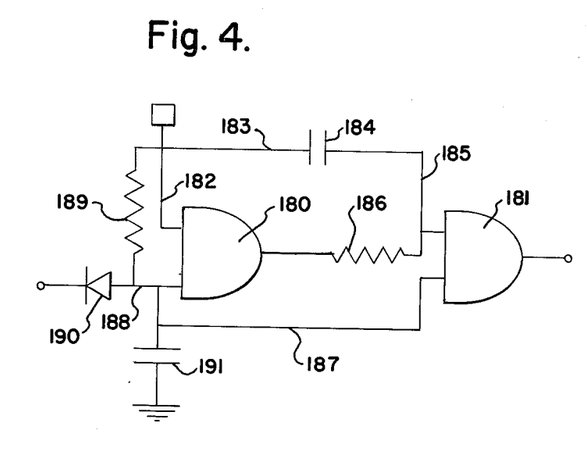
FIG. 4 is a schematic of a delayed pulse network employed in my apparatus.

Delayed pulse network 94 is one of six such networks employed in my apparatus. A circuit schematic for such a network is shown in FIG. 4 and will be described hereinafter. For present purposes it is necessary only to say that the application of a negative pulse to its input sets the network to produce a delayed negative output pulse of limited duration, and the removal of the negative pulse from its input triggers that output pulse. A second delayed pulse network 99 has its input terminal connected to conductor 75 through conductor 100 and its output terminal connected through conductors 101, 102, and diode 32 to the input of network 94.

The operation of so much of my apparatus as has been described above will now be set out. As has been mentioned, the letter grades are entered into the calculator in binary code as one or more negative pulses. The add, subtract, and decimal point functions of the calculator and divide and clear functions to be described, are also initiated by a negative pulse to the appropriate calculator terminal. A letter grade, such as B, is entered by depressing B switch key 21. The pulse so produced is passed by diode 37 to conductor 26 and through diode 27 and conductor 28 to calculator input terminal 29, corresponding to the digit 1. The pulse is also passed through diode 38 to conductor 33 and through diode 34 and conductor 35 to calculator input terminal 36, the digit 2 terminal. The digit 3 is thus entered in the calculator, the numerical value of B. The same pulse is passed on to conductor 53. The pulse on conductor 26 is transmitted through conductor 50, diode 51 and conductor 52. The pulse on conductor 33 is transmitted through conductor 54, diode 55 and conductor 56. From conductor 53 the pulse passes through diode 69, conductors 70 and 77 to the set input of flip-flop 79. A negative pulse on that input terminal sends a positive pulse from the set output over conductor 80 to one input of gate 83. The output terminal of gate 83 is connected to terminal 91 of calculator 10, the add function terminal, and gate 83 is thus set to trigger that function when a pulse shall appear on conductor 85. That pulse is supplied by delayed pulse network 94. The pulse on conductor 53 is supplied to the input of network 94. When that pulse is terminated, network 94 sends a negative pulse from its output terminal through conductor 95 and inverter 96 to conductor 85. The positive pulse on that conductor causes gate 83 to send a negative pulse to terminal 91 of calculator 10, which then adds the digit 3 to other numbers entered in it.

Sign entries are made by depressing either key 63 for plus or 64 for minus. The result is that 0.3 is either added or subtracted from the total in calculator 10. When switch 64 is depressed it applies a negative pulse to reset input terminal of flip-flop 79, which then sends a positive pulse from its reset output over conductor 81 to one input of dual NAND gate 84. This gate 84 is set to transmit a pulse to terminal 92 of the calculator, its subtract function terminal, when a positive pulse appears on conductor 85. When key 64 is depressed the resulting negative pulse is also passed through diode 74 and conductor 75 to decimal point function terminal 76 of calculator 10. The calculator is thus set to add or subtract a decimal fraction.

The operation, in this case subtraction, is effected by network 99. The negative pulse on conductor 75 is applied to the input of network 99 through conductor 100. When switch 64 is released network 99 sends a delayed negative pulse over conductors 101, 102, diode 93 and conductor 109 and diode 98 and conductor 103 to calculator terminals 29 and 36, entering digit 3. That pulse is also transmitted through diode 32 to the input of network 94, which as before provides the delayed negative pulse to gate 84, causing it to pass a trigger pulse from its output through conductor 86 to terminal 92 of calculator 10, its subtract functional terminal.

COUNT AND AVERAGING LOGIC

Figure 3:
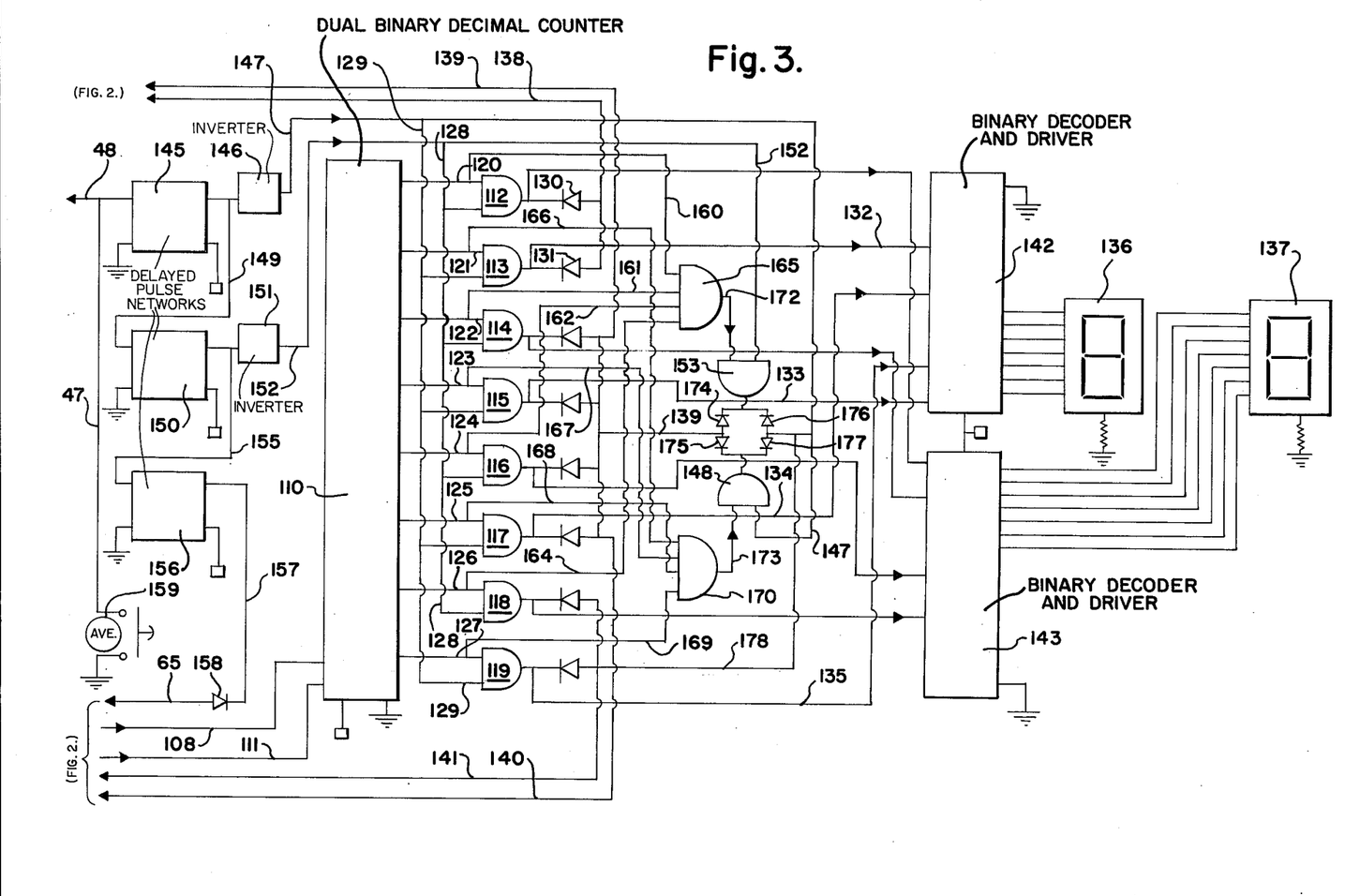
FIG. 3 is a schematic of the counting and averaging logic as well as the logic and control circuits for displaying the entry count.

A third delayed pulse network 104 has its input connected to conductor 53. Its output is connected through conductor 105 and inverter 106 to the set input of flip-flop 107 and also directly to the reset input of that flip-flop. The reset output of flip-flop 107 is carried through conductor 108 to the preset input terminal of dual binary decimal counter 110, (FIG. 3). Each negative pulse appearing on conductor 53 triggers logic network 104 so that the release of the key producing the pulse generates a delayed negative pulse on conductor 105, which through inverter 106 appears as a positive pulse on set input of flip-flop 107. The negative pulse on conductor 105 is also applied to the reset input of flip-flop 107. The output of that flip-flop is therefore a delayed clean undistorted pulse to counter 110.

The outputs of counter 110 are each connected to one terminal each of two-input NAND gates 112–119 respectively, by conductors 120–127 respectively. The other input of each alternate gate 112, 114, 116 and 118 is connected to conductor 128. The other input of each alternate gate 113, 115, 117 and 119 is connected to conductor 129. The outputs of gates 112 and 113 are connected together through diodes 130 and 131 respectively, and the junction of the diodes is connected to conductor 138, which is connected through conductor 28 to terminal 29 of calculator 10. In like manner the outputs of gate 114 and gate 115 are connected through conductors 139 and 35 with terminal 36 of calculator 10. The outputs of gates 116 and 117 are connected through conductors 140 and 41 to terminal 42 of calculator 10, and the outputs of gates 118 and 119 are connected through conductor 141 to terminal 46 of calculator 10. The outputs of gates 113, 115, 117 and 119 are connected directly to inputs of binary decoder and seven-segment driver 142 by conductors 132, 133, 134 and 135 respectively, and the outputs of gates 112, 114, 116 and 118 are likewise directly connected to the inputs of binary decoder and seven-segment driver 143. The output of decoder 142 is connected to first display device 136 and the output of decoder 143 is connected to second display device 137.

Conductor 48 (FIG. 2) from the divide function terminal 49 of calculator 10 is connected to the input terminal of delayed pulse network 145. Conductor 48 is also connected to the live terminal of averaging key switch 159 by conductor 147. The other terminal of switch 159 is grounded. The output of network 145 is connected through inverter 146 and conductor 147 to one input of two-input NAND gate 148. The output of network 145 is also connected directly through conductor 149 to the input of delayed pulse network 150. Its output is connected through inverter 151 and conductor 152 to one input of two-input NAND gate 153. The output of delayed pulse network 150 is connected directly through conductor 155 to the input of delayed pulse network 156. The output of that network is connected by conductor 157, diode 158, conductors 65 and 89 (FIG. 2) to terminal 91 of calculator 10, its add function terminal.

The outputs of counter 110 to gates 112, 114, 116 and 118 are connected through conductors 160, 161, 162 and 164 respectively to the inputs of four-input NOR gate 165. The outputs of counter 110 to gates 113, 115, 117 and 119 are connected through conductors 166, 167, 168 and 169 to the inputs of four-input NOR gate 170. The output of NOR gate 165 is connected to the other input of NAND gate 153 through conductor 172, and the output of NOR gate 170 is connected to the other input of NAND gate 148 through conductor 173. The output of gate 153 is connected by diode 174 to conductor 139, as is the output of gate 148 through diode 175. Conductor 139 is connected to terminal 36 of calculator 10, as has been mentioned. The output of gate 153 is also connected through diode 176 and conductor 178 to conductor 141, as is the output of gate 148 through diode 177. Conductor 141 is connected to terminal 46 of calculator 10, as has been mentioned.

The counting and averaging logic above described is operated each time a letter key 20–24 is depressed and released. The releasing triggers delayed pulse network 104 as has been mentioned, so as to transmit a negative pulse over conductor 108 to the input of counter 110. The number of pulses so counted appears at the outputs of counter 110 in binary code and is gated to binary decoders 142 and 143 by gates 112 through 119. The decoders drive display elements 136 and 137. When the averaging key 159 is depressed a negative pulse is sent over conductors 147 and 148 to terminal 49, the divide function terminal of calculator 10. That pulse is also transmitted to the input of delayed pulse network 145. When key 159 is released a negative output pulse is sent from its output terminal to inverter 146, and a positive pulse from that inverter is transmitted by conductor 147 to one input terminal each of NAND gates 113, 115, 117, 119 and 148. Those gates then enter the first binary number into calculator 10 over conductors 138, 139, 140 and 141. The pulse from network 145 is also transmitted to the input of delayed pulse network 150 which in its sequence sends a negative output pulse to inverter 151 and the positive pulse resulting is transmitted over conductor 152 to one input each of NAND gates 112, 114, 116, 118 and 153. Those gates then enter the second binary number into calculator 10 over conductors 138, 139, 140 and 141. The outputs of counter 110 to gates 112, 114, 116 and 118 are also supplied to the input of four-input NOR gate 165, and the outputs of counter 110 to gates 113, 115, 117 and 119 to the inputs of four input NOR gate 170. The two-input NAND gate 148 opens when it receives a pulse from gate 170 and from delayed pulse network 145 via counductor 147, and like two-input NAND gate 153 opens when it receives a pulse from gate 165 and from delayed pulse network 150. The outputs of gates 148 and 153 are transmitted to terminals 36 and 46 of calculator 10.

The delayed pulse from network 150 is sent to delayed pulse network 156 the output of which is transmitted over conductor 65 to the add function terminal 91 of calculator 10. In this case "add" is equivalent to "equals" and the calculator completes the operation.

DELAYED PULSE NETWORKS

The network, shown in FIG. 4, comprises two two-input NAND gates 180 and 181. One input terminal of gate 180 is connected to positive potential by conductor 182. That conductor is connected to one terminal of capacitor 184 by conductor 183. The other terminal of capacitor 184 is connected by conductor 185 to one input terminal of gate 181. The output of gate 180 is also connected to that input of gate 181 by a resistor 186. The other input of gate 181 is connected to the other input of gate 180 by conductor 187, which is also connected to one terminal of capacitor 191. The other terminal of capacitor 191 is grounded. Input to the network is through diode 190 to the other input of gate 180 through conductor 188. The latter is connected to positive voltage through resistor 189.

With no input on diode 190 the inputs of gates 180 and 181 connected by conductor 187 are held positive by the positive potential applied through resistor 189 and the charge on capacitor 191. The other input of gate 180 is permanently positive, and the output of that gate to resistor 186 is therefore negative. Capacitor 184 is therefore charged, via resistor 186, and that input of gate 181 is negative. The output of gate 181 is therefore positive.

When a negative pulse is applied to diode 190, capacitor 191 is discharged and the gate inputs connected by conductor 187 become negative. This causes the output of gate 180 to go positive. When this happens capacitor 184 is discharged through resistor 186 and that input of gate 181 becomes positive. The output of gate 181 therefore remains positive.

When the negative pulse on diode 190 terminates, by release of a switch key, for example, capacitor 191 begins to charge again through resistor 189, at a rate determined by their time constant. Thus, the inputs connected by conductor 187 become positive again, and the output of gate 180 switches to negative. Capacitor 184 thereupon charges through resistor 186, and that input of gate 181 remains positive for a time determined by the capacitor 184-resistor 186 time constant and the resistor 189-capacitor 191 time constant. For that period of time, the output of gate 181 is negative.

AVERAGE DISPLAY CONTROL LOGIC

Figure 5:
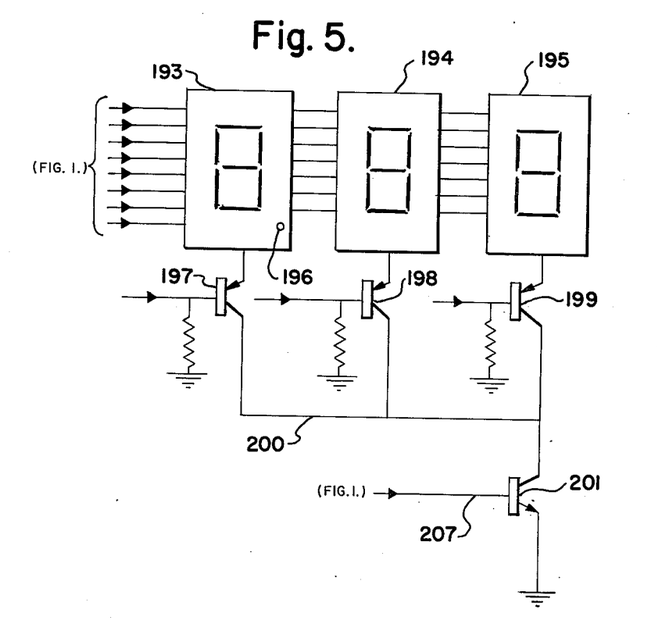
FIG. 5 is a schematic of the average display control circuits.

The average display control circuits are shown in FIG. 5, and the logic therefore in FIG. 2. The segment drivers 11 shown in the block schematic of FIG. 1 drive three conventional seven-segment display elements 193, 194 and 195. The first display element 193 is provided with a decimal point indicator 196, which requires a driver in addition to the drivers for the segments of the display unit. The cathodes of elements 193, 194 and 195 are connected to the emitters of PNP transistors 197, 198 and 199, respectively, the collectors of which are connected through conductor 200 to the collector of NPN transistor 201. The emitter of that transistor is grounded. Transistors 197, 198 and 199 are the digit drivers 12 shown in FIG. 1, and their bases are connected to the digit driver terminals of calculator 10.

Conductor 48 (FIG. 2) is connected by conductor 202, diode 203 and conductor 204 to the set input of flip-flop 206. That input is connected to positive voltage through resistor 205. The set output of flip-flop 206 is connected by conductor 207 to the base of transistor 201 (FIG. 5). When averaging key 159 (FIG. 3) is depressed, a positive pulse is applied to the set input of flip-flop 206 and that flip-flop transmits a positive pulse over conductor 207, which causes transistor 201 to conduct and activate the elements 193, 194 and 195 of average display 13.

CLEARING

Key switch 209 (FIG. 2) has one terminal grounded and its live terminal connected to conductor 210, which is also connected to terminal 154 of calculator 10, its clear terminal. Conductor 210 is connected by conductor 214, diode 215 and conductor 217 to the reset input of flip-flop 269. That input is also connected to positive potential through resistor 216. Conductor 210 is also connected through inverter 213 to conductor 111, which is connected to the clear terminal of dual binary decimal counter 110 (FIG. 3).

When switch 209 is depressed, it applies a negative pulse to the clear terminal of calculator 10, and also to the reset input of flip-flop 206, which switches off the positive voltage on conductor 207 and disables average display 13. The corresponding positive pulse from inverter 213 is transmitted over conductor 111 to counter 110, clearing it also.

In the foregoing specification I have described presently preferred embodiments of my invention; however, it will be understood that my invention can be otherwise embodied within the scope of the following claims.

I claim:

1. Apparatus for adding the averaging grades selected from a series of letters of descending grade value separated from each other and augmented or decreased by plus and minus signs comprising binary coded means for converting each letter into a digit in a consecutive series of descending values, means for converting plus and minus signs into a decimal fraction less than half of the difference between successive digits, binary coded means connected to the output of said letter converting means and to the output of said sign converting means for adding those digits corresponding to the selected grades and for adding algebraically thereto the fractions corresponding to the plus and minus signs associated with the selected grades, binary coded means connected to the input of said adding means for counting the number of selected grades added, decoding means connected to the output of said counting means for converting the binary coded grade count to decimal digits, means connected to the output of said decoding means for displaying those digits, and means connected to the output of said adding means and to the output of said counting means for averaging the selected grades by dividing the binary coded sum of the selected grades by the binary coded count of grades added.

2. Apparatus of claim 1 in which said means for adding the digits comprise an integrated circuit calculator having a plurality of digit input terminals, and said means for converting letters to digits comprise a set of keys, one for each letter, and means connecting those keys to the respective digit input terminals of the calculator so that depressing a key applies a binary coded pulse to the corresponding digit input terminal and enters that digit in the calculator.

3. Apparatus of claim 2 in which the calculator has add and subtract function terminals and including a first delayed pulse network, means connecting the input of the delayed pulse network to the digit input terminals and means connecting the output of the delayed pulse network to the add terminal of the calculator, so that when a depressed key is released, a delayed pulse is transmitted to the add terminal of the calculator and the previously entered digit is added.

4. Apparatus of claim 3 in which the delayed pulse network has a positive output both with zero input and negative inputs, but provides a negative output pulse when its input is switched from negative to zero.

5. Apparatus of claim 3 in which the means for converting plus and minus signs into a decimal fraction comprise a plus and a minus key, a decimal point input terminal on the calculator connected to said plus and minus keys, a flip-flop, means connecting the set input of the flip-flop to the digit input terminals of the calculator and to the plus key, means connecting the reset input of the flip-flop to the minus key, means connecting the reset output of the flip-flop to the subtract function terminal of the calculator and means connecting the set output of the flip-flop to the add terminal of the calculator, and including means for entering that fraction in the calculator comprising a second delayed pulse network, means connecting the input of the second delayed pulse network to the plus and minus keys and means connecting the output of the second delayed pulse network to a digit input terminal of the calculator having the desired value of decimal fraction, whereby when a plus or minus key is depressed, a decimal point is entered in the calculator and when that key is released the desired decimal fraction is entered in the calculator.

6. Apparatus of claim 5 including means for subtracting the desired decimal fraction from the digit added in the calculator comprising means connected to the output of the first delayed pulse network for switching that output from the add to subtract terminals of the calculator when the minus key is depressed.

7. Apparatus of claim 2 in which the means for counting the number of selected grades added comprise a binary coded decimal counter and including means connecting the set of keys, one for each letter, to the input of the binary coded decimal counter whereby the count of letter grades entering into the computer is displayed on the said means for displaying those digits.

8. Apparatus of claim 7 in which the calculator has a divide function terminal and in which said means for averaging the selected grades added in the calculator comprise means connecting the output of the binary coded decimal counter to the digit input terminals of the caluculator as a divisor, and including an averaging key connected to supply a pulse to the divide terminal of the calculator.

9. Apparatus of claim 7 in which the binary coded decimal counter is a first binary coded decimal counter, the decoding means for converting the binary coded grade count to decimal digits are first decoding means and the means connected to the output of said decoding means for displaying those digits are first display means, and including a second binary coded decimal counter having its input connected to the input of the first binary coded decimal counter, second decoding means for converting the binary coded grade count to decimal digits connected to the output of the second binary coded decimal counter and second display means connected to the output of the second decoding means first and second groups of two-input NAND gates, means connecting the outputs of the first group of gates to the first decoding means, means connecting the outputs of the second group of gates to the second decoding means, means connecting the outputs of the first counter to the first inputs respectively of the first group of gates, means connecting the outputs of the second counter to the first inputs respectively of the second group of gates, first means connecting together the second inputs of the first group of gates, second means connecting together the second inputs of the second group of gates, and a delayed pulse network having its input connected to the first means connecting together and its output connected to the second means connecting together, whereby the counter outputs are automatically switched from first to second decoder by a delayed pulse from the delayed pulse network.

* * * * *

UNITED STATES PATENT AND TRADEMARK OFFICE
CERTIFICATE OF CORRECTION

PATENT NO. : 4,118,783
DATED : October 3, 1978
INVENTOR(S) : William L. Collins

It is certified that error appears in the above-identified patent and that said Letters Patent are hereby corrected as shown below:

Column 3, line 25, "rest" should be --reset--.

Column 4, line 46, "functional" should be --function--.

Column 7, line 43, "269" should be --206--.

Column 7, line 60, Claim 1, "the" should be --and--.

Column 9, Claim 8, line 9, "caluculator" should be --calculator--.

Signed and Sealed this

Twenty-seventh Day of March 1979

[SEAL]

Attest:

RUTH C. MASON
Attesting Officer

DONALD W. BANNER
Commissioner of Patents and Trademarks